(12) United States Patent
Foskett et al.

(10) Patent No.: US 10,360,025 B2
(45) Date of Patent: Jul. 23, 2019

(54) INFRASTRUCTURE INSTANTIATION, COLLABORATION, AND VALIDATION ARCHITECTURE FOR SERVERLESS EXECUTION FRAMEWORKS

(71) Applicant: Accenture Global Solutions Limited, Dublin (IE)

(72) Inventors: Roger Foskett, Middlesex (GB); Thomas W. Myers, LaGrange, IL (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/699,207

(22) Filed: Sep. 8, 2017

(65) Prior Publication Data
US 2019/0079751 A1 Mar. 14, 2019

(51) Int. Cl.
| | | |
|---|---|---|
| G06F 9/44 | (2018.01) | |
| G06F 9/45 | (2006.01) | |
| G06F 9/445 | (2018.01) | |
| G06F 8/71 | (2018.01) | |
| G06F 8/70 | (2018.01) | |

(52) U.S. Cl.
CPC .   *G06F 8/71* (2013.01); *G06F 8/70* (2013.01)

(58) Field of Classification Search
CPC .................. G06F 8/71; G06F 8/10–71; G06F 9/44505–44589; H04L 63/20
See application file for complete search history.

(56) References Cited

U.S. PATENT DOCUMENTS

| | | | |
|---|---|---|---|
| 8,769,017 B2 | 7/2014 | Jakobson | |
| 8,931,038 B2 | 1/2015 | Pulier et al. | |
| 9,354,869 B2 * | 5/2016 | Apte | G06F 8/71 |
| 9,621,428 B1 * | 4/2017 | Lev | H04L 41/12 |
| 9,811,394 B1 * | 11/2017 | Kogias | G06F 9/541 |
| 9,853,913 B2 | 12/2017 | Foskett et al. | |
| 10,037,196 B2 | 7/2018 | McPherson et al. | |

(Continued)

OTHER PUBLICATIONS

Ognjen Scekic, Programming Model Elements for Hybrid Collaborative Adaptive Systems, 2015, pp. 278-287. https://ieeexplore.ieee.org/stamp/stamp.jsp?tp=&arnumber=7423093 (Year: 2016).*

(Continued)

*Primary Examiner* — Mongbao Nguyen
(74) *Attorney, Agent, or Firm* — Brinks Gilson & Lione

(57) ABSTRACT

Successfully deploying resources into the cloud is a constantly increasing technical challenge as more cloud service providers emerge, each offering disparate computing platforms, services, assets, supported technical components, and other features, including serverless execution. An infrastructure build and collaboration architecture for serverless execution environments solves the technically complex challenges around allowing developers to work independently in physically separated locations. To this end, the architecture allows shared object repositories to be brought together when required and provides an object-model for defining resources without requiring the developer to have complete expert knowledge of the target deployment language. The architecture also enforces policy for both software design and infrastructure, and performs deep validation of the infrastructure built for the developer.

20 Claims, 7 Drawing Sheets

(56) References Cited

U.S. PATENT DOCUMENTS

| | | | | |
|---|---|---|---|---|
| 2010/0306379 | A1* | 12/2010 | Ferris | G06F 9/5072 709/226 |
| 2011/0231899 | A1 | 9/2011 | Pulier et al. | |
| 2012/0239825 | A1* | 9/2012 | Xia | G06F 9/44505 709/250 |
| 2013/0346946 | A1* | 12/2013 | Pinnix | G06F 8/71 717/124 |
| 2014/0278623 | A1* | 9/2014 | Martinez | G06Q 10/06 705/7.12 |
| 2014/0317716 | A1* | 10/2014 | Chao | H04L 63/10 726/9 |
| 2015/0358810 | A1* | 12/2015 | Chao | H04W 52/0209 455/418 |
| 2016/0098263 | A1 | 4/2016 | Spivak et al. | |
| 2016/0124742 | A1* | 5/2016 | Rangasamy | H04L 47/70 717/103 |
| 2016/0216948 | A1 | 7/2016 | McPherson et al. | |
| 2017/0003960 | A1* | 1/2017 | Subramanian | G06F 8/76 |
| 2017/0026416 | A1* | 1/2017 | Carpenter | H04L 41/0866 |
| 2017/0046134 | A1* | 2/2017 | Straub | G06F 8/36 |
| 2017/0052764 | A1* | 2/2017 | Laskey | G06F 8/31 |
| 2017/0064012 | A1 | 3/2017 | Duell et al. | |
| 2017/0192765 | A1* | 7/2017 | Smith | G06F 8/36 |
| 2017/0249393 | A1* | 8/2017 | Nair | H04L 67/02 |
| 2018/0095771 | A1* | 4/2018 | Warkentin | G06F 9/4416 |
| 2018/0107525 | A1* | 4/2018 | Govindaraju | G06F 8/60 |
| 2018/0181439 | A1 | 6/2018 | Jackson et al. | |
| 2018/0201371 | A1* | 7/2018 | Kramer | B64D 1/16 |

OTHER PUBLICATIONS

Garrett McGrath, Cloud Event Programming Paradigms Applications and Analysis, 2016, pp. 1-7. https://ieeexplore.ieee.org/stamp/stamp.jsp?tp=&arnumber=7820297 (Year: 2016).*

Theo Dimitrakos, Common capabilities for service oriented infrastructures and platforms, 2010, pp. 181-188. https://ieeexplore.ieee.org/stamp/stamp.jsp?tp=&arnumber=5693260 (Year: 2010).*

Jurgen Cito, An Empirical Analysis of the Docker Container Ecosystem on GitHub, 2017, pp. 323-332. https://ieeexplore.ieee.org/stamp/stamp.jsp?tp=&arnumber=7962382 (Year: 2017).*

Maciej Malawski, Towards Serverless Execution of Scientific Workflows-HyperFlow Case Study, 2016, pp. 25-32 http://ceur-ws.org/Vol-1800/paper4.pdf (Year: 2016).*

Ikuo Nakagawa, a design and implementation of global distributed POSIX file system on the top of multiple independent cloud services, 2016, pp. 867-872. https://ieeexplore.ieee.org/stamp/stamp.jsp?tp=&arnumber=7557734 (Year: 2016).*

U.S. Appl. No. 15/699,184, filed Sep. 8, 2017, Foskett et al.

U.S. Appl. No. 15/827,815, filed Nov. 30, 2017, Foskett et al.

State—Terraform by HashiCorp, "State" URL: https://www.terraform.io/docs/state/index.html obtained from the Internet on Sep. 19, 2017, 2 pages.

State—Terraform by HashiCorp, "Purpose of Terraform State" URL: https://www.terraform.io/docs/state/purpose.html obtained from the Internet on Sep. 19, 2017, 3 pages.

Configuring Resources—Terraform by HashiCorp, "Resource Configuration" URL: https://www.terraform.io/docs/configuration/resources.html obtained from the Internet on Sep. 19, 2017, 9 pages.

Load Order and Semantics—Terraform by HashiCorp, "Load Order and Semantics" URL: https://www.terraform.io/docs/configuration/load.html obtained from the Internet on Sep. 19, 2017, 1 page.

Configuration Syntax—Terraform by HashiCorp, "Configuration Syntax" URL: https://www.terraform.io/docs/configuration/syntax.html obtained from the Internet on Sep. 19, 2017, 4 pages.

Interpolation Syntax—Terraform by HashiCorp, "Interpolation Syntax" URL: https://www.terraform.io/docs/configuration/interpolation.html obtained from the Internet on Sep. 19, 2017, 15 pages.

Overrides—Terraform by HashiCorp, "Overrides" URL: https://www.terraform.io/docs/configuration/override.html obtained from the Internet on Sep. 19, 2017, 2 pages.

Configuration Resources—Terraform by HashiCorp, "Resource Configuration" URL: https://www.terraform.io/docs/configuration/resources.html obtained from the Internet on Sep. 19, 2017, 9 pages.

Configuring Data Sources—Terraform by HashiCorp, "Data Source Configuration" URL: https://www.terraform.io/docs/configuration/data-sources.html obtained from the Internet on Sep. 19, 2017, 4 pages.

Configuring Providers—Terraform by HashiCorp, "Provider Configuration" URL: https://www.terraform.io/docs/configuration/providers.html obtained from the Internet on Sep. 19, 2017, 5 pages.

Configuring Variables—Terraform by HashiCorp, "Variable Configuration" URL: https://www.terraform.io/docs/configuration/variables.html obtained from the Internet on Sep. 19, 2017, 9 pages.

Configuring Outputs—Terraform by HashiCorp, "Output Configuration" URL: https://www.terraform.io/docs/configuration/outputs.html obtained from the Internet on Sep. 19, 2017, 3 pages.

Configuring Local Values—Terraform by HashiCorp, "Local Value Configuration" URL: https://www.terraform.io/docs/configuration/locals.html obtained from the Internet on Sep. 19, 2017, 4 pages.

Configuring Modules—Terraform by HashiCorp, "Module Configuration" URL: https://www.terraforrm.io/docs/configuration/modules.html obtained from the Internet on Sep. 19, 2017, 2 pages.

Configuring Terraform—Terraform by HashiCorp, "Terraform Configuration" URL: https://www.terraform.io/docs/configuration/terraform.html obtained from the Internet on Sep. 19, 2017, 3 pages.

Configuring Terraform Enterprise—Terraform by HashiCorp, "Terraform Enterprise Configuration" URL: https://www.terraform.io/docs/configuration/terraform-enterprise.html obtained from the Internet on Sep. 19, 2017, 2 pages.

Environment Variables—Terraform by HashiCorp, "Environment Variables" URL: https://www.terraform.io/docs/configuration/environment-variables.html obtained from the Internet on Sep. 19, 2017, 4 pages.

Office Action in U.S. Appl. No. 15/699,184, dated Nov. 14, 2018, pp. 1-23.

Brikman, Yevgeniy, "A comprehensive Guide to Terraform—Gruntwork", Sep. 26, 2016, pp. 1-6, available at https://blog.gruntwork.io/a-comprehensive-guide-to-terraform-b3d32832baca.

Brikman, Yevgeniy, "How to manage Terraform state—Gruntwork", Oct. 3, 2016, pp. 1-19, Available at https://blog.gruntwork.io/how-to-manage-terraform-state-28f5697e68fa.

Brikman, Yevgeniy, "How to use Terraform as a team—Gruntwork", Oct. 12, 2016, pp. 1-18, Available at https://blog,gruntwork.io/how-to-use-terraform-as-a-team-251bc1104973.

Anonymous, "AWS: aws_lambda_function-Terraform by HashiCorp https", Jul. 7, 2017, pp. 1-6, Available at https://web.archive.org/web/20170707015003/https://www.terraform.io/docs/providers/aws/r/lambda_function.html.

Anonymous: "What is AWS Lambda?—AWS Lambda", Jul. 10, 2017, pp. 1-4, Available at https://web.archive.org/web/20170710111343/http://docs.aws.amazon.com:80/lambda/latest/dg/welcome.html.

Brikman, Yevgeniy, "Terraform: Up and Running: Writing Infrastructure as Code", Mar. 7, 2017, O'Reilly Media, XP002786888, ISBN: 1491977086.

Anonymous: "Status Checks for Your Instances—Amazon Elastic Compute Cloud", Jul. 29, 2017, pp. 1-8, Available at https://web.archive.org/web/20170729004009/https://docs.aws.amazon.com/AWSEC2/latest/UserGuide/monitoring-system-instance-status-check.html.

Amazon Web Services: "AWS re:Invent 2015(DV0209) JAWS: The Monstrously Scalable Severless Framework", Oct. 12, 2015, Available at https://www.youtube.com/watch?v=D_U61u06I90.

Corbet: "2.5.59+ kernel makefile documentation [LWN.net]", Feb. 4, 2003, pp. 1-17, Available at https://1wn.net/Articles/21835.

Virakraingsei Hai Socheat: "Automatic and scalable cloud framework for parametric studies using scientific applications", Sep. 1, 2016, pp. 1-50, Available at https://uu.diva-portal.org/smah/get/diva2:1045455/FULLTEXT01.pdf.

Extended European Search Report issued in European patent application No. EP18193487 dated Jan. 30, 2019, 19 pages.

(56) References Cited

OTHER PUBLICATIONS

European Search Report issued in European patent application No. EP18193482 dated Feb. 12, 2019, 10 pages.

* cited by examiner

INFRASTRUCTURE INSTANTIATION, COLLABORATION, AND VALIDATION ARCHITECTURE FOR SERVERLESS EXECUTION FRAMEWORKS

TECHNICAL FIELD

This application relates to infrastructure instantiation and team collaboration in technically challenging serverless execution frameworks.

BACKGROUND

The processing power, memory capacity, network connectivity and bandwidth, available disk space, and other resources available to processing systems have increased exponentially in recent decades. These resources have for many years been powerful enough to allow a single physical server to host many instances of virtual machines (VMs) and virtualized functions (VFs). These advances had led to the extensive provisioning of a wide spectrum of functionality into specific pockets of concentrated physical processing resources that may be located virtually anywhere, i.e., in the cloud. A more recent development is serverless execution frameworks that eliminate the need for statically provisioned servers and instead provision and execute functions dynamically, e.g., in response to pre-defined triggers. Improvements in serverless execution frameworks will drive the further development and implementation of flexible functionality into the cloud.

DETAILED DESCRIPTION

The Figures described below provide an example context for the discussion of technical solutions for an infrastructure instantiation, collaboration, and validation ("ICV") architecture for serverless execution frameworks presented in detail below. The examples in the Figures show one of many possible different implementation contexts. In that respect, the technical solutions are not limited in their application to the architectures and systems shown in the Figures, but are applicable to many other implementations, architectures, and processing.

One technical benefit of the architecture is that is allows developers to work independently in physically separated locations by allowing shared object repositories to be brought together when required. The architecture also allows developers to quickly become productive by providing an abstract object model for defining resources without having complete expert knowledge of the target deployment language. The architecture further enforces policy for both software design and infrastructure. Successfully deploying and executing resources in the cloud is a constantly increasing technical challenge as more cloud service providers emerge, each offering disparate computing platforms, services, assets, supported technical components, and other features, including serverless execution. Expressed another way, the architecture solves technically complex challenges that exist in serverless frameworks related to allowing developers to work independently in physically separated locations. Among other shortcomings, prior resource deployment languages do not have the syntax or capability to support multiple remote teams and team members. The architecture implements orchestration of a variety of tools to achieve the deployment of, especially, serverless resources and code functions, and enables them to function together in the same environment.

Figure 1:
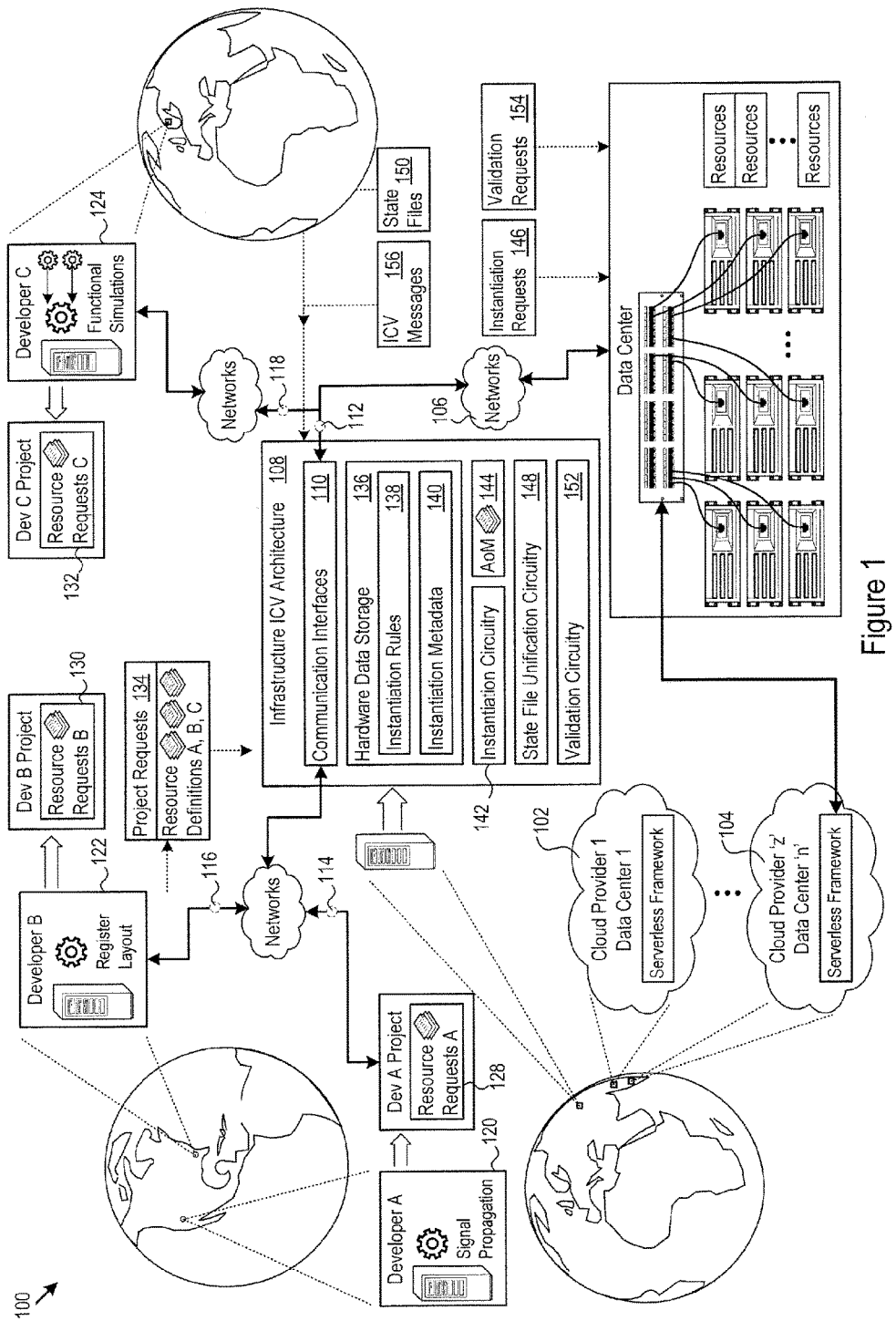
FIG. 1 shows an example of a global network architecture.

FIG. 1 shows entities communicating across a global network 100. For instance, distributed across the global network 100 are cloud based serverless infrastructure providers, e.g., the infrastructure providers 102 and 104. The infrastructure providers may be located in any geographic region, e.g., United States (US) East, US West, India or Central Europe. The geographic regions that characterize the infrastructure providers may be defined according to any desired distinctions to be made with respect to location. An infrastructure provider may provide cloud computing infrastructure in multiple geographic locations and provide different resources depending on location.

The infrastructure providers provide computing resources through delivery platforms that are generally publicly available. Infrastructure providers may additionally or alternatively provide computing resources "on-premises", which typically refers to a location inside the enterprise that uses the resources, often including increased privacy, security, and control compared to public cloud resources. Examples of infrastructure providers and brokers to such providers include Amazon, Google, Microsoft, and Accenture, who offer, e.g., Amazon Web Services (AWS), Google Compute Engine (GCE), Microsoft Azure (Azure), and Windows Azure Pack (WAP), as just a few examples.

Throughout the global network 100 are networks, e.g., the network 106, that provide connectivity within the infrastructure providers and between the infrastructure providers and other entities. The networks 106 may include private and public networks defined over any pre-determined and possibly dynamic internet protocol (IP) address ranges.

An infrastructure instantiation, collaboration, and validation ("ICV") architecture ("architecture") 108 makes complex serverless infrastructure provisioning decisions for complex serverless execution environments. In addition, the architecture 108 facilitates collaboration among individual members of developer teams who may be geographically or temporally separated, thereby allowing the developer team to rapidly develop code while team members work remotely. The architecture 108 also validates the infrastructure that it has directed an infrastructure provider to build, e.g., by executing provisioned resource policy enforcement.

In the example in FIG. 1, the architecture 108 includes communication interfaces 110 that establish communication channels with other entities in the global network 100. Similarly, the communication interfaces in the infrastructure provider data centers and at the geographically distributed developer sites also establish communication channels with the other entities in the global network 100. A few examples of communication channels running on top of the communication physical hardware include: HTTP, HTTPS, FTP, SMTP, Web Services, SOAP over HTTP/HTTPs, and REST over HTTP/HTTPs communication channels. As a few specific examples, FIG. 1 shows a provider communication channel 112 to the infrastructure providers and developer communication channels 114, 116, and 118 to three specific developers: developer A 120, developer B 122, and developer C 124.

For the purposes of discussion below, the developers are assumed to work on a 10 nm VLSI processor simulation project, but note that the architecture 108 is applicable to any given project. Developer A 120 is developing high speed signal propagation simulation code and developer B is developing optimized layouts for processor register files. Developer A 120 and developer B 122 can work independently, as the resources provisioned for their projects and the project data are not inter-dependent. Developer C, however, is writing layout functional simulations that require access to both the signal propagation simulations and the register files layout simulations. Moreover, these projects execute in whole or in part with support from serverless frameworks (e.g., AWS Lambda) provided by the infrastructure providers.

Described in more detail below, the architecture 108 implements an abstract object model (AoM) 144 with a defined syntax that is provided to the developers 120-124. The AoM 144 provides the developers 120-124 with an improved mechanism including specific developer extensions for specifying their project infrastructure as code (infrastructure-as-code, or IaC). FIG. 1 shows, for instance, that the developers 120, 122, and 124 have written the resource requests 128, 130, and 132, respectively, that adhere to the AoM syntax. The resource requests 128-132 specify the hardware and software resources, and their configurations, that the developers need for their individual projects, e.g., VMs with specified CPUs, memory type and quantity, and disk space; application packages; email servers; databases; networks; Kinesis streams; user logins; application and user permissions; encryption keys and algorithms; or other resources and configurations.

The developers submit their resource definitions as project resource requests 134 to the architecture 108. The architecture 108 executes infrastructure instantiation for the resources, facilitates developer collaboration through state file unification, and carries out deep infrastructure validation. The operational details of the architecture 108 are described in detail further below.

In one implementation, the architecture 108 includes hardware data storage 136. Among other operational data, the hardware data storage 136 may store instantiation rules 138 and instantiation metadata 140. Instantiation circuitry 142 interprets the AoM 144 and executes the instantiation rules 138 with input from the instantiation metadata 140 to issue infrastructure instantiation requests 146 to cause instantiation of the resources requested by the developers 120-124.

Further, state file unification circuitry 148 facilitates developer collaboration by receiving and managing state files 150 for the individual developer projects. In the example above, the state file unification circuitry 148 will allow developer C 124 to work with the resources and project data belonging to developer A 120 and developer B 122.

In addition, the architecture 108 includes a validation circuitry 152. The validation circuitry 152 helps to ensure that the instantiation requests 146 that the architecture 108 makes to the infrastructure providers are completed correctly, cause the expected infrastructure results, and that the infrastructure remains correct over time. To that end, the validation circuitry 152 issues validation requests 154 to the infrastructure providers. The infrastructure providers return ICV messages 156 to the architecture 108. Examples of ICV messages 156 include responses to validation requests, responses to instantiation requests, and infrastructure status messages.

Figure 2:
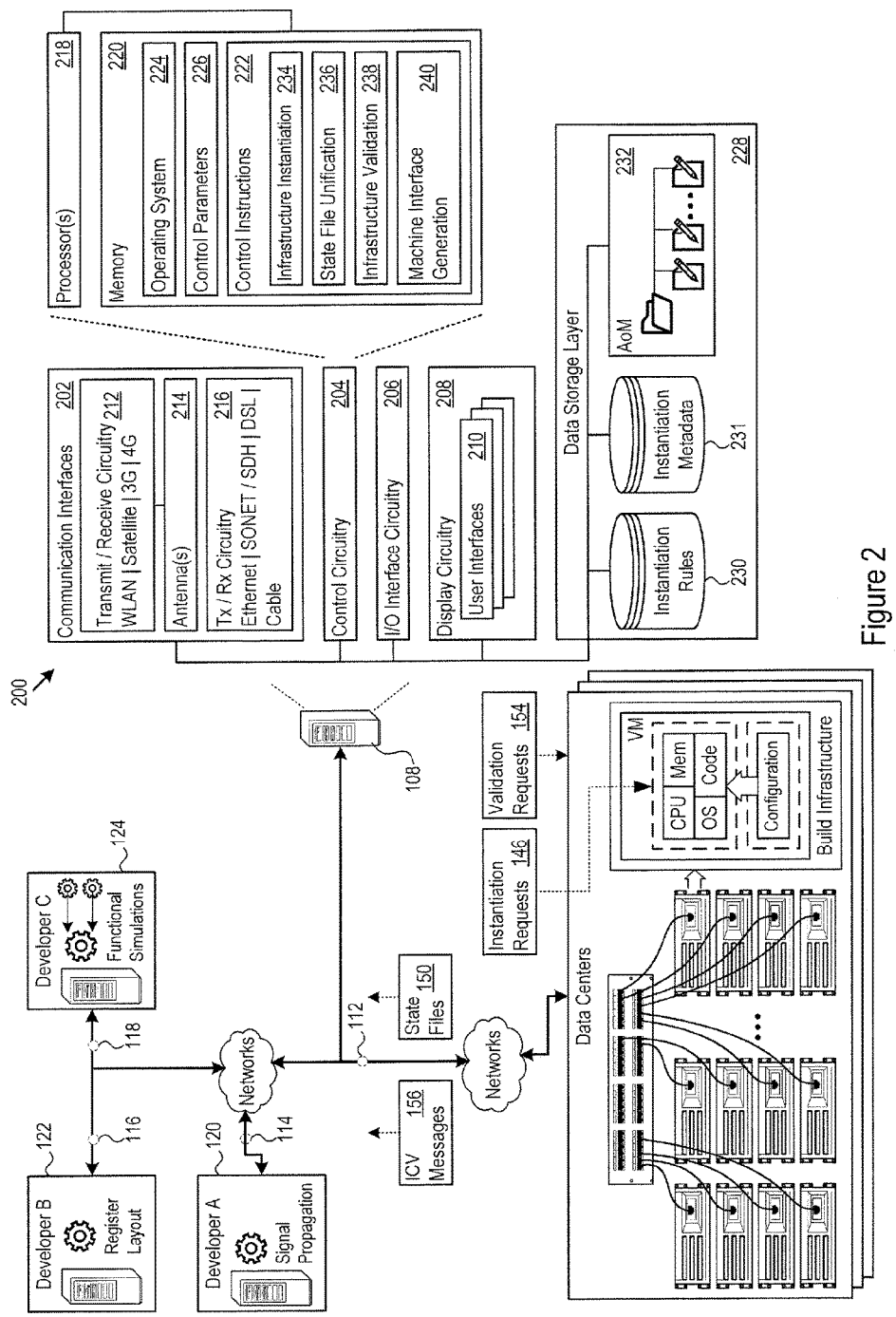
FIG. 2 illustrates an example implementation of an infrastructure instantiation, collaboration, and validation architecture.

FIG. 2 shows an example implementation 200 of the architecture 108. The architecture 108 includes communication interfaces 202, control circuitry 204, input/output (I/O) interface circuitry 206, and display circuitry 208. The architecture 108 generates the GUIs 210 locally using the display circuitry 208, or for remote visualization, e.g., as HTML, JavaScript, audio, and video output for a web browser running on a local or remote machine. Among other interfaces, the GUIs 210 may include interfaces for infrastructure request submission, specification of projects, specification of project relationships to other projects, e.g., the relationship of the project for developer C 124 to the projects for developer A 120 and developer B, reporting infrastructure request status, reporting infrastructure validation status, and other features.

The GUIs 210 and the I/O interface circuitry 206 may include touch sensitive displays, voice or facial recognition inputs, keyboards, mice, speakers and other user interface elements. Additional examples of the I/O interface circuitry 206 include microphones, video and still image cameras, headset and microphone input/output jacks, Universal Serial Bus (USB) connectors, memory card slots, and other types of inputs. The I/O interface circuitry 206 may further include magnetic or optical media interfaces (e.g., a CDROM or DVD drive), serial and parallel bus interfaces, and keyboard and mouse interfaces.

The communication interfaces 202 may include hardware such as wireless transmitters and receivers ("transceivers") 212 and any antennas 214 used by the transmit and receive circuitry of the transceivers 212. The transceivers 212 and antennas 214 may support WiFi network communications, for instance, under any version of IEEE 802.11, e.g., 802.11n or 802.11ac. The communication interfaces 202 may also include physical medium transceivers 216. The physical medium transceivers 216 may provide physical layer interfaces for any of a wide range of communication protocols, such as any type of Ethernet, data over cable service interface specification (DOCSIS), digital subscriber line (DSL), Synchronous Optical Network (SONET), or other protocol.

The control circuitry 204 may include any combination of hardware, software, firmware, or other circuitry. The control circuitry 204 may be implemented, for example, with one or more systems on a chip (SoC), application specific integrated circuits (ASIC), microprocessors, discrete analog and digital circuits, and other circuitry. The control circuitry 204 may implement any desired functionality in the architecture 108, including the hardware data storage 136, the instantiation circuitry 142, the state file unification circuitry 148, and the validation circuitry 152.

As just one example, the control circuitry 204 may include one or more instruction processors 218 and memories 220. The memories 220 store, for example, control instructions 222 and an operating system 224. In one implementation, the processor 218 executes the control instructions 222 and the operating system 224 to carry out any desired functionality for the architecture 108, including the functionality described above and below regarding serverless function builds and library insertion. The control parameters 226 provide and specify configuration and operating options for the control instructions 222, operating system 224, and other functionality of the architecture 108.

The architecture 108 may include a data storage layer 228 that hosts any number of local data repositories. As a few examples, the data storage layer 228 includes instantiation rules 230, instantiation metadata 231, and the model definition of the AoM 232 for writing infrastructure requests. While FIG. 2 shows the data storage layer 228 local to the architecture 108, the architecture 108 may connect to any network entity to access and exchange other sources of instantiation rules, instantiation metadata, or any other data that facilitates serverless artifact build and library insertion.

The control instructions 222 drive the functionality of the architecture 108. Described in more detail below, the control instructions 222 may include infrastructure instantiation logic 234, state file unification logic 236 for team collaboration, and infrastructure validation logic 238. The infrastructure instantiation logic 234 carries out the complex task of directing infrastructure providers to provision and configure the resources the developer has requested. The state file unification logic 236 provides a mechanism for controlling resource state files to facilitate project collaboration among the developers. The infrastructure validation logic 238 implements deep validation of instantiated resources at the infrastructure providers. FIG. 2 also shows machine interface logic 240 that generates the GUIs 210 to provide interfaces for communicating with other entities in the global network 100, including with the developers 120-124, and the infrastructure providers.

Any particular implementation of the architecture 108 may vary widely compared to other implementations. In some implementations, the infrastructure provider may be AWS, providing the AWS Lambda serverless execution environment, the infrastructure as code execution tool may be the Terraform™ tool, and the code loading tool for serverless functions may be the Apex™ tool. These examples are used for the purposes of illustration below, and other implementations may be configured for different infrastructure providers and different tools.

There are many technical challenges involved with building infrastructure and allowing team collaboration in a serverless execution framework, e.g., AWS Lambda. Serverless execution frameworks face the unique challenge that it can be very unpredictable when resources will be active and when serverless code needs to run. Further, the serverless nature of execution means that the infrastructure resources instantiated for any given developer may vary over time. Accordingly, independent developers had little or no expectation or guarantee of the availability of the serverless resources used by other developers, let alone the state of those resources. The architecture 108 addresses these technical challenges and others.

Figure 3:
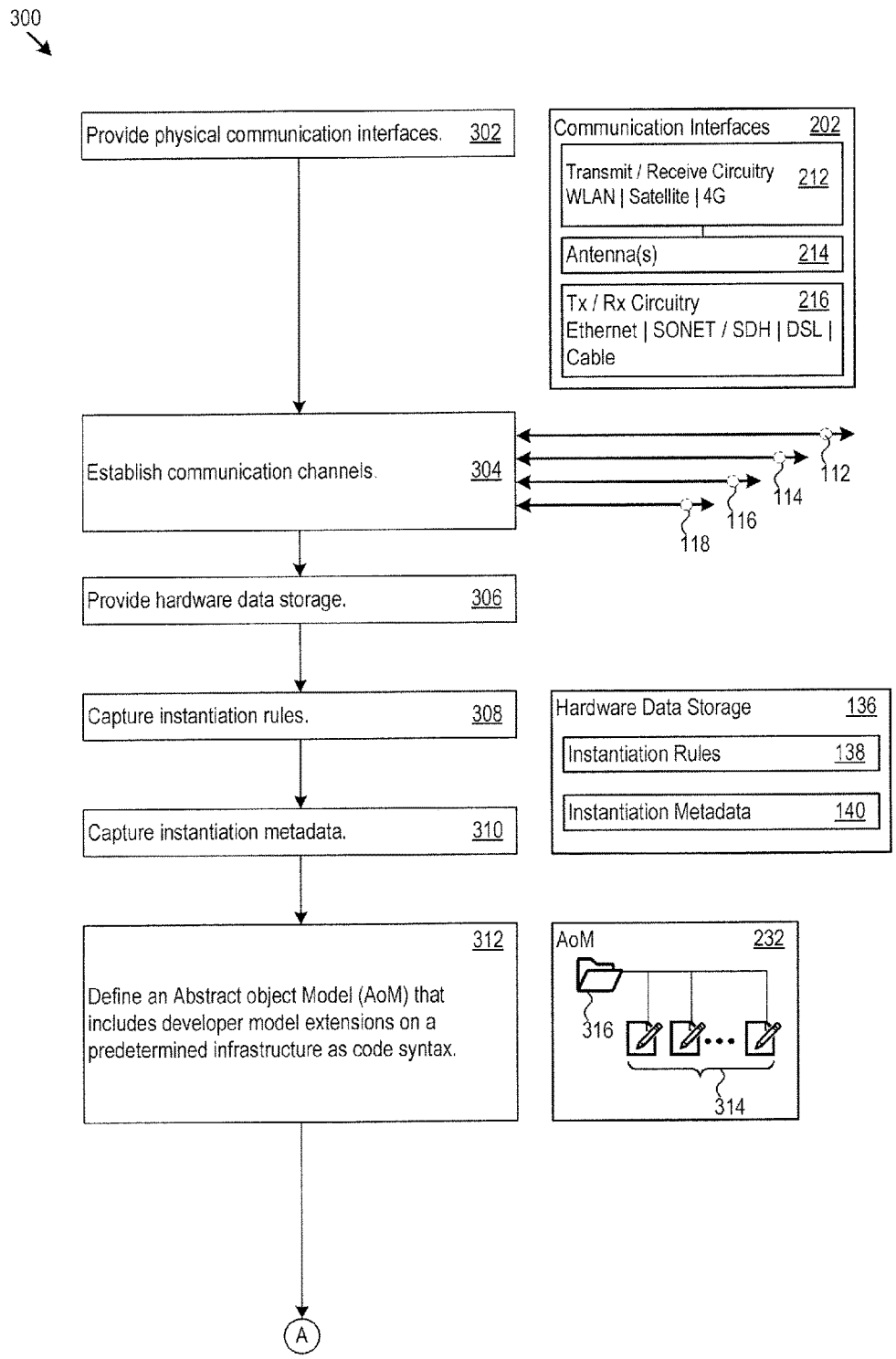
FIGS. 3 and 4 show an example of logic that the architecture may implement in control circuitry.
Figure 4:
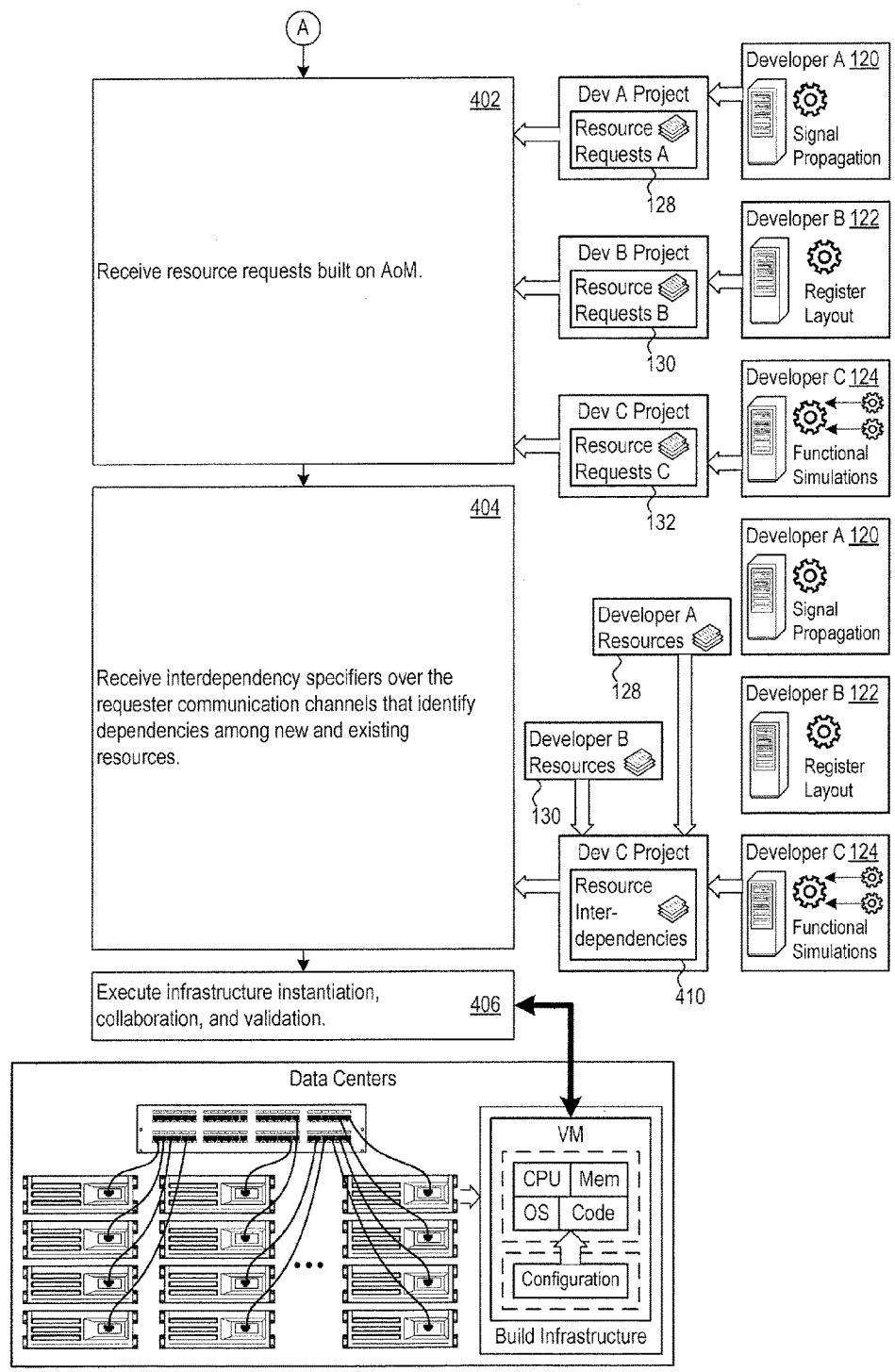

FIGS. 3 and 4 show an example of logic 300 that the architecture 108 may implement in the control circuitry 204, e.g., in the infrastructure instantiation logic 234, state file unification logic 236, and validation logic 238. The architecture 108 provides physical communication interfaces 202 (302) and establishes communication channels running over the physical hardware (304). Examples of these communication channels include a provider communication channel 112 to the infrastructure providers and developer communication channels 114, 116, and 118.

The architecture 108 also provides hardware data storage 136 (306) which may include solid state and magnetic hard disk storage drives and drive arrays, as examples. The architecture 108 may capture a wide range of infrastructure data in the hardware data storage 136. For instance, the architecture 108 may capture instantiation rules 138 (308) and capture instantiation metadata 140 (310) for infrastructure resources in the hardware data storage 136.

The architecture 108 also defines an AoM 232 (312). The AoM 232 may include, e.g., developer model extensions 314 on a predetermined base IaC syntax 316. In one implementation, the base IaC syntax 316 may be the Terraform™ syntax. The developer model extensions 314 may provide instances of higher level abstraction than the IaC syntax 316, for example. The developer model extensions 314 facilitate developers (who are generally not experts in IaC syntax) more easily specifying the resources that their projects require, and specifying those resources with fewer errors. As just one example, the developer model extensions 314 may provide a much more succinct mechanism for specifying identity and access management (IAM) policies for project resources. The architecture 108 accepts resource requests for project resources defined using the AoM 232 in a predetermined format, e.g., as comma separated values (CSV) or as "yet another markup language" (YAML) files. Table 1, below, shows an example resource request in YAML for a Dynamo database table.

Examples of developer model extensions 314 include common override attributes and resource specific attribute overrides. Tables 2 and 3, further below, describe several examples of the higher-level abstractions provided by the developer model extensions 314. The architecture 108 may provide many additional, different, or fewer abstractions in any given implementation.

The AoM provides a general-purpose mechanism which allows the developer to create a configuration file which defines instances of some resource known or unknown to the framework. By processing the AoM configuration file, the architecture 108 will create a resource specification in the target execution language which defines the intended resource(s). For known resource types, the architecture 108 may perform additional optimization. For unknown types, the architecture 108 will generate the specification without resource-specific optimization.

Tables 2 and 3 shown just one of may possible example syntaxes which can be used to access the abstraction concepts implemented in the architecture 108. For these to be successfully used, the architecture 108 is made aware of the underlying construct being abstracted. When processing, the architecture 108 generates those elements along with any specific resources in the target execution language.

When the architecture 108 processes an AoM document, the architecture 108 may include certain default elements (per resource type) as they are required either by design need or by design policy. These elements will take a default format, but the element and format defaults can be overridden by the syntax specified in Tables 2 and 3, as further explained below.

The developers write resource requests to specify the resources needed for their particular work on a predetermined project. The architecture 108 receives the resource requests (402). In some circumstances, a developer may work independently of other developers on the same project. However, in many instances the work of one developer may depend upon and require access to the resources instantiated for other developers. The example above assumes that developer C 124 requires access to resources belonging to both developer A 120 and developer B 122, e.g., resources that capture the current design progress of the signal propagation simulations and the register layout optimizations.

Each developer may provide interdependency specifiers that the architecture 108 receives (404). For instance, the interdependency specifiers 410 indicate that developer C is working on a project that requires access to specific resources that developer A 120 and developer B 122 happen to have created for their projects. That is, the interdependency specifier may identify a dependency between any project resources within any specified projects. The interdependency specifier indicates the project from which dependent resources are required, and may be present with the AoM specification prepared by the developer. The architecture 108 may implement and recognize mechanisms other than explicit references in the AoM specification for specifying dependencies. Given the resource requests, the architecture 108 executes infrastructure instantiation, collaboration, and validation (406). While this specification discusses a specific example of the developer A 120, developer B 122, and developer C 124, note that a given developer may work on many different projects and many developers may work on the same projects. Furthermore, resources within projects are not specific to developers. As such, projects and resources within projects generally are not tied to specific developers. The architecture 108 implements a mechanism that makes any specified set of projects and their resources available to any specified set of developers (in a global sense), so that any developer may refer to any project or resource in or from any other project, regardless of developer. As such, the architecture 108 fully supports developers working on the same project, and not simply developers who reference projects that other developers happen to work on.

Figure 5:
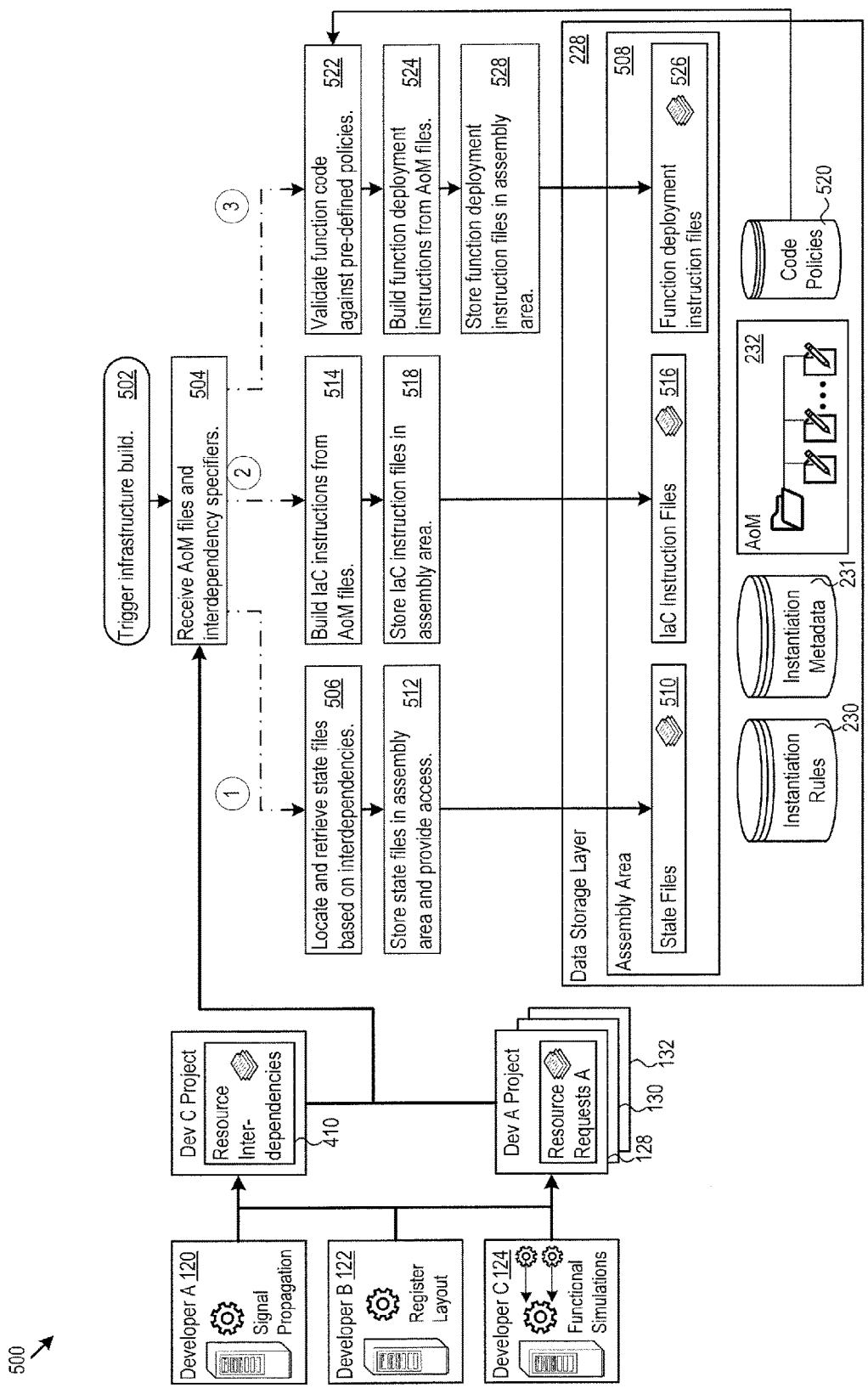
FIGS. 5 and 6 show an example of logic that the architecture may implement in control circuitry, e.g., in infrastructure instantiation instructions, state file unification instructions, and validation instructions to execute infrastructure instantiation, collaboration, and validation.

FIG. 5 shows an example of logic 500 that the architecture 108 may implement in the instantiation circuitry 142, the state file unification circuitry 148, and the validation circuitry 152. The architecture 108 may also implement the logic 500 in the control circuitry 204, e.g., in infrastructure instantiation logic 234, state file unification logic 236, and validation logic 238 to execute infrastructure instantiation, collaboration, and validation. When an infrastructure build is triggered (502), the architecture 108 obtains the resource requests, e.g., in the form of AoM files from the developers, along with resource interdependency specifiers, if any (504). FIG. 5 shows one example build process that proceeds along three parallel paths.

Along a first path, the architecture 108 locates and retrieve state files based on the interdependencies (506). For instance, the state file unification circuitry 148 in the architecture 108 may request and obtain the state files from an infrastructure as code execution tool (e.g., the Terraform™ tool) that was responsible for instantiating the resources that are identified as having dependencies with other resources. The state file unification circuitry 148 defines as assembly area 508, e.g., in the data storage layer 228, that provides a working area for resource setup staging for newly requested resources that have dependencies on other resources. The state file unification circuitry 148 stores the state files 510 in the assembly area 508 (512).

Note that the state file unification circuitry 148 may provide references to the state files for other resources in the IaC instruction files 516. More generally, the state file unification circuitry 148 in the architecture 108 provides access to the state files for a set of resources by other resources that depend on the set of resources. That is, the state file unification circuitry 148 brings together the state files for one or more resources into the common assembly area 508. In the common assembly area 508, the state file unification circuitry 148 may provide another resource access to the set of the state files.

Continuing the example above, the functional simulation resources that developer C 124 employs may reference the state files for the signal propagation resources allocated to developer A 120, and to the state files for the register layout resources allocated to developer B 122. As one particular example, the functional simulation resource may search the state files of resources for other developers to determine the current state of any given resource of those other developers. In addition to current state, state files may also include mappings between a project resource and actual implementation of the project resource within the infrastructure provider. Accordingly, resources with access to the state files may obtain useful information concerning the implementation details of other resources, as well as their current state.

Along a second path, the instantiation circuitry 142 in the architecture 108 builds IaC instructions from the AoM files (514). In this regard, the instantiation circuitry 142 may implement a pre-defined translation from each developer model extension to the base IaC syntax 316. The architecture 108 stores the IaC instruction files 516 in the assembly area 508 (518).

The instantiation rules 138 and instantiation metadata 140 aid in the generation of the IaC instruction files. For example, the instantiation rules 138 may include a set of rules for each resource type. The rules determine how the architecture 108 generates the IaC instructions and may also enforce standards, rules, or other best-practices. The instantiation metadata 140 may specify, e.g., a target environment, staging area, code execution engine, mechanisms for obtaining provider credentials, and the like. During execution, the instantiation circuitry 142 processes each developer resource request, and in particular: matches the requested resource with a rule set for the resource type, follows those rules to generate IaC instructions, saves the IaC instruction files in the assembly area 508, and reports status, e.g., to the requesting developer.

Along a third path, the architecture 108 validates function code against pre-defined policies 520 (522). The policies may take the form of, e.g., best practice code writing and deployment practices. For the code that passes the pre-defined policies 520, the architecture 108 builds function deployment instructions responsive to the function resources defined in the AoM files (524). The architecture 108 stores the function deployment instruction files 526 in the assembly area 508 (528).

Figure 6:
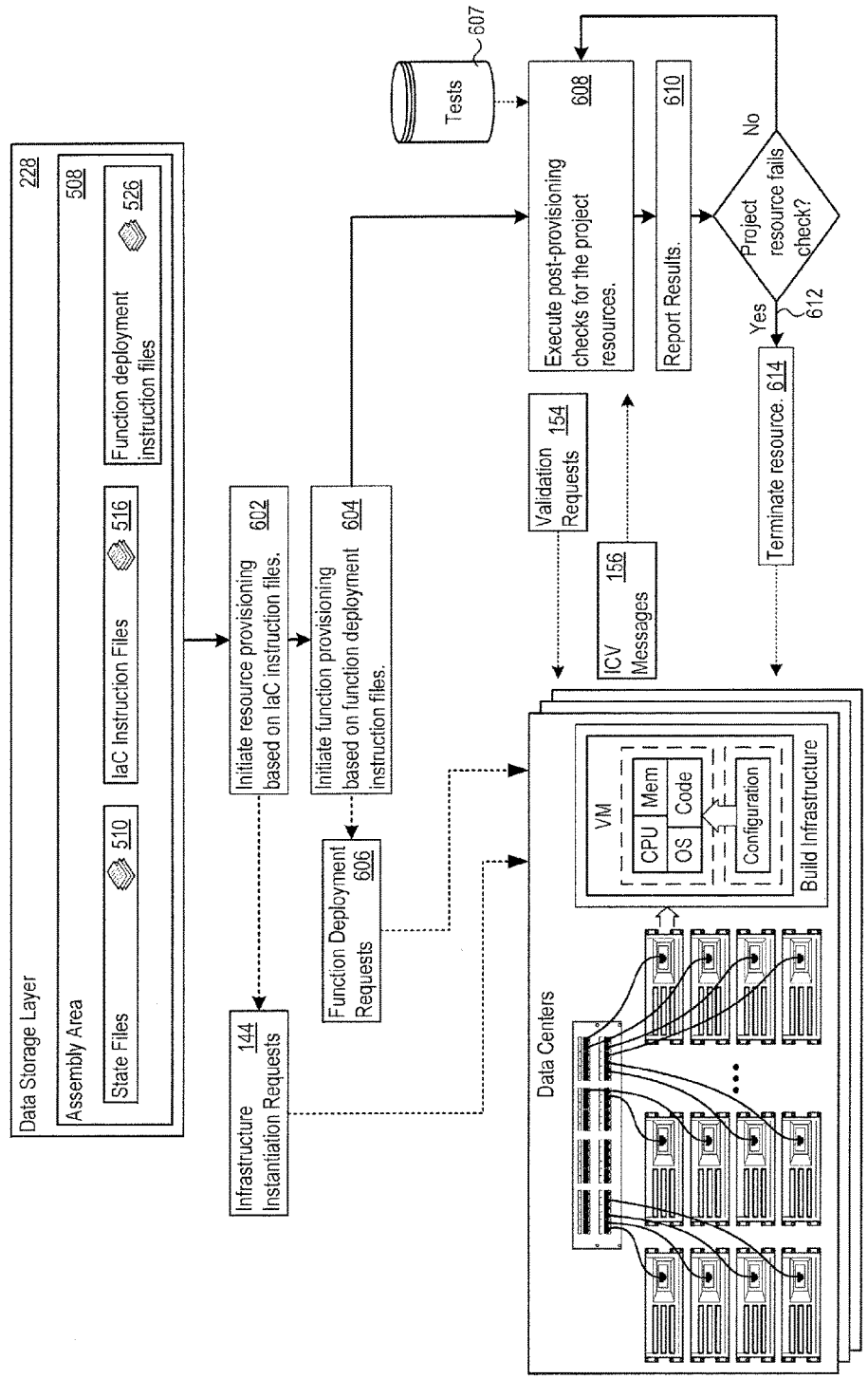

The assembly area 508 provides a central mechanism for holding data elements that the architecture 108 may need for provisioning resources, validating provisioned resources, and facilitating developer collaboration. FIG. 6 continues the example of FIG. 5, starting from the data elements in the assembly area 508. In particular, the architecture initiates resource provisioning based on the IaC instruction files 516 to instantiate requested project resources (602). To that end, in one implementation, the architecture 108 may transmit the IaC instruction files to an infrastructure as code execution tool (such as the Terraform™ tool) to carry out the resource provisioning specified in the IaC instruction files 516. The infrastructure as code execution tool may in turn issue infrastructure instantiation requests 146 and configuration requests to the infrastructure providers.

Similarly, the architecture 108 initiates function provisioning based on the function deployment instruction files 526 (604). In that regard, the architecture 108 may execute pre-defined translations from the function specifiers in the AoM code to the syntax employed by any pre-determined code loading tool, thereby arriving at function deployment instructions in the tool syntax. In one implementation, the architecture 108 may transmit the function deployment instruction files 526 to a code loading tool (such as the Apex™ tool) to carry out the function deployment specified in the function deployment instruction files 526. The code loading tool may in turn issue function deployment requests 606 to the infrastructure providers.

FIG. 6 also illustrates logic for resource validation. The validation circuitry 152, for instance, may carry out the validation logic. In particular, the validation circuitry 152 executes post-provisioning tests 607 against project resources after they are instantiated with infrastructure provider (608). The post-provisioning tests 607 may be defined in many ways. In one implementation, the post-provisioning tests 607 are stored in a pre-defined directory structure, with sub-directories corresponding to each resource or component of multiple resources to test, with the test code stored in each respective sub-directory for the validation circuitry 152 to execute.

As the validation circuitry 152 proceeds through each sub-directory, the validation circuitry 152 issues validation requests 154 against the infrastructure service providers. For instance, the validation circuitry 152 may call pre-defined provider APIs and report the status results (610). The APIs return ICV messages 156 that include, e.g., the requested resource status. When a project resource fails a post-provisioning check (612), the validation circuitry 152 may automatically request termination of the resource (614). The validation circuitry 152 may continue to check the resources on any given schedule for as long as desired, thereby detecting changes over time to the resources that may make the resources non-compliant and fail their post-provisioning checks.

The validation circuitry 152 executes infrastructure tests that provide an extra layer of testing of the infrastructure definitions for a given component. This deep infrastructure testing ensures that key resources such as dynamodb™ tables cannot be accidentally deleted or misconfigured in a given environment. Testing that the infrastructure meets the required definition is especially relevant to components that are split across pipelines and release timelines and where performing end to end integration/acceptance tests across both independently deployable pipelines is not always easily feasible. When end to end acceptance tests are not possible (for example due to decoupled pipelines), without a separate set of infrastructure tests, developers may easily accidentally delete or misconfigure infrastructure resources, and for the misconfigurations to be propagated all through way through to production via the CI/CD pipeline.

In one implementation, the validation circuitry 152 performs software development kit (SDK) calls to the infrastructure provider for each resource defined in the configuration of tests, e.g., in the set of sub-directories noted above. After making the SDK calls, the validation circuitry 152 may use, e.g., object query expressions (such as JMESPath expressions for java script object notation (JSON)) to validate that the resource has been configured as expected. For instance, the validation circuitry 152 may validate that a dynamodb™ table exists and has specific HASH and RANGE attributes. The architecture 108 may automatically invoke the validation circuitry 152 after instantiating or updating resources in the infrastructure provider. Whether or not the validation circuitry 152 executes may also depend on whether and when a test directory exists within the code repository for a given component. A component may include multiple resources that the validation circuitry 152 will test.

Figure 7:
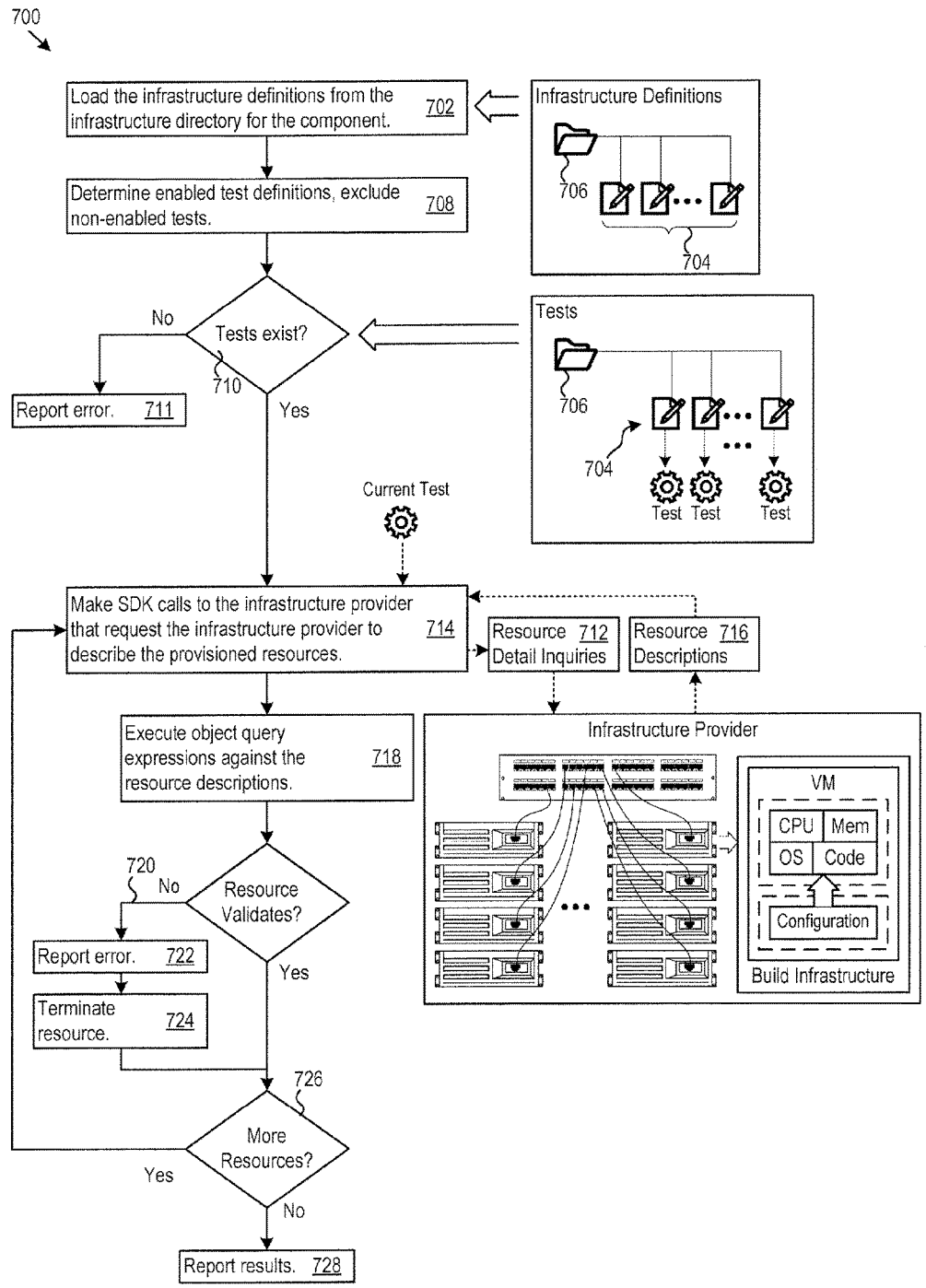
FIG. 7 shows further detail of the logic implemented in the validation engine.

FIG. 7 shows a specific example of the logic 700 that the validation circuitry 152 may implement. In the example of FIG. 7, validation circuitry 152 loads the infrastructure definitions 704, written, e.g., in YAML, CSV, or JSON, from the infrastructure directory 706 (e.g., "infrastructure_test") for the component (702). The validation circuitry 152 may load only the infrastructure test definitions that include an enable flag set to True, from the infrastructure directory 706. Expressed another way, the validation circuitry 152 may exclude non-enabled tests from execution (708).

The validation circuitry 152 also checks that all desired tests exists. For instance, the validation circuitry 152 may check that a corresponding infrastructure test exists for every infrastructure definition (710), and exit with an error report if there is a mismatch (711). This check ensures that if enabled, e.g., by the presence of an infrastructure_test directory in the component, every infrastructure definition is covered by at least one infrastructure test. In some cases, the validation circuitry 152 mandates that test cases exist for specific resources that are defined, e.g., for database tables.

Given the test definitions, the validation circuitry 152 executes the tests. More specifically, the validation circuitry 152 may issue resource detail inquiries 712 to the infrastructure provider. The resource detail inquiries 712 request the infrastructure provider to return descriptive details concerning the provisioned resource (714), e.g., as resource descriptions 716. As examples, the resource detail inquiries 712 may take the form of SDK calls to the infrastructure provider or the form of command line interface commands issued to the infrastructure provider.

Expressed another way, the infrastructure provider, responsive to the resource detail inquiries 712, returns the resource descriptions 716, e.g., in JSON format. The resource descriptions 716 returned by SDK calls are typically more verbose and detailed than, e.g., simple resource presence/absence checks. The validation circuitry 152 thereby obtains a deeper level of insight into exactly how the resource is currently provisioned and its status within the infrastructure provider. Table 11 provides an example of a detailed resource description returned by an SDK call.

The validation circuitry 152 parses the resource descriptions 716. For instance, the validation circuitry 152 may execute one or more object query expressions against the resource descriptions 716 (718) to validate the resource configuration. The object query expressions may be written in JMESPath as just one example, or another query language. If the resource fails to validate (720), then the validation circuitry 152 may report the error (722) and issue instructions to the infrastructure provider to terminate the resource (724). The validation circuitry 152 executes the tests for each IaC resource type and each resource specified in the test file for each component (726), and may also report the overall test results (728).

EXAMPLES

Table 1 shows an example YAML resource request.

TABLE 1

YAML resource request name : IaC resource type - Optional
enabled : true by default, if set to false, architecture 108 will not process the YAML file
resources : list of objects, with each object representing the resource
comment
enabled: true
name: aws_dynamodb_table TABLE 1-continued

| YAML resource request |
|---|
| resources:<br>- name: billing_daily-cost<br>  attribute:name=type: AccountId=S;DateSeconds=N;DateYear=N<br>  hash_key: AccountId<br>  range_key: DateSeconds<br>  global_secondary_index:map:<br>  name=YearQuery;hash_key=DateYear;range_key=DateSeconds;projection_<br>  type=KEYS_ONLY;write_capacity=5;read_capacity=5<br>- name: billing_weekly-cost<br>  attribute:name=type: AccountId=S;DateSeconds=N;DateYear=N<br>  hash_key: AccountId<br>  range_key: DateSeconds<br>  global_secondary_index:map:<br>  name=YearQuery;hash_key=DateYear;range_key=DateSeconds;projection_<br>  type=KEYS_ONLY;write_capacity=5;read_capacity=5<br>- name: billing_total-cost<br>  attribute:name=type: AccountId=S;DateSeconds=N<br>  hash_key: AccountId<br>  range_key: DateSeconds<br>- name: billing_account<br>  attribute:name=type: TenantId=S;AccountId=S<br>  hash_key: TenantId<br>  range_key: AccountId<br>- name: billing_preferences<br>  attribute:name=type: TenantId=S<br>  hash_key: TenantId |

Table 2 provides examples of high level abstractions provided by the developer model extensions 314.

TABLE 2

| Common Override Attributes | |
|---|---|
| Developer Model Extension | Description |
| _permissions | Generate IAM policy based on the permissions supplied (applies to specific resource types, e.g., IAM Role and Lambda functions).<br>Although raw policies can be specified using :EOF attribute, this takes up a great deal of space and can be specified far more succinctly. The _permissions specification format per line or semicolon (;) delimitated is:<br><service,>\|<action,>=<resource,><br>One or more service, action or resource can be specified using a comma (,) delimiter.<br>Examples:<br>dynamodb\|GetItem=table/runtimeconfig<br>dynamodb\|GetRecords,DescribeStream,ListStreams,PutItem=* |
| _permissions_wildcards | Used in conjunction with _permissions<br>By default, the deployment framework does not allow ANY IAM policy that contains wildcards in the resource part of the specification, however<br>this can be disabled by setting _permissions_wildcards to True<br>This means, that if you have a policy such as the following is trying to access ALL dynamodb resources (the * at the end):<br>dynamodb\|GetRecords,DescribeStream,ListStreams,PutItem=*<br>validation will fail with a message similar to "Wildcards '*' for accessing resources are not allowed . . . , you must be specific"<br>This doesnt apply to the following services:<br>'logs','sns','cloudwatch','lambda','ec2' and 'kms'<br>As we want to allow minimum, least privileged access policies - this should only be set to True by exception (eg a component truly needs<br>access to all dynamodb tables) |
| _permissions_cross_project | Used in conjunction with _permissions<br>By default, the deployment framework does not allow ANY IAM policy specified by a component to access dynamodb or s3 resources from |

TABLE 2-continued

Common Override Attributes

| Developer Model Extension | Description |
|---|---|
| | another component. This can be disabled by setting _permissions_cross_project to True<br>This basically means, that if you have a policy that attempts to access the metrics-utilisation_daily-utilisation dynamodb table resource from the billing component, without this set to True, it will fail with message similar to "Resource must only access dynamodb resources belonging to the component . . . not metrics-utilisation_daily-utilisation"<br>As we want to allow minimum, least privileged access policies - this should only be set to True by exception (eg a component needs access to another components resources) |
| _permissions_no_arn_prefix | suppress generating arn prefix for resources (eg arn:aws . . . ) as some services such as elasticache and EC2 ENI require true "*" wildcard resources to be specified |
| _permissions_effect | Used in conjunction with _permissions, typically used on S3 bucket policies<br>Certain elements require a security policy be created to allow the resources to work as specified. The _permissions parameter (above) is used to indicate such a policy should be generated. These follow a typical format. However, in certain use-cases, the typical format is not appropriate. In such cases, additional modifiers such as _permissions_effect or _permissiones_conditions specify the specific departures from the typical format. |
| _permissions_conditions | Used in conjunction with _permissions, typically used on S3 bucket policies<br>See the comments above in _permissions_effect.<br>_effect will specify an effect, which is not typically required for other resource types.<br>_conditions will specify under what conditions a policy element is effective, which is not typically required for other resource types.<br>Without these modifiers (all _permissions modifiers) the policy generated, while typically appropriate for many resources, would not be appropriate for the given resource.<br>Examples of how these are used is shown in Table 4 and the output generated in Table 5. |
| _skip_resource | If True, skip processing the resource |
| _resource_name | Override the resource name |
| _skip_resource_pre | If True, skip processing the pre-processing part of any create-infra.py generation specific to the resource type |
| _skip_resource_post | If True, skip processing the post-processing part of any create-infra.py generation specific to the resource type |
| _invocation_alarm_limit | Set to an integer value, specifies the number of times a lambda can be invoked before it triggers its runaway_alarm. The idea is to catch any lambdas that are firing far more than expected and racking up a high usage billing. |

Table 3 provides additional examples of high level abstractions provided by the developer model extensions 314.

TABLE 3

Resource Specific Override Attributes

| Developer Model Extension | Description |
|---|---|
| _authorisation | Used with _proxy_mode, allows specific authorisation to be specified in generated aws_api_gateway_method. Default is "NONE" |
| _http_method | Used with _proxy_mode, allows specific http_method to be specified in generated aws_api_gateway_method. Default is "ANY" |
| _lambda_function | Used with _proxy_mode, allows specific lambda function to be specified, defaults to lambda function starting with |

TABLE 3-continued

Resource Specific Override Attributes

| Developer Model Extension | Description |
| --- | --- |
| | component name and ending in "_api"<br>Multiple lambdas and top level path parts can be specified for a single api gateway deployment by specifying value in format<br><lambda_function_name>=<path_part>\|<auth>;<br>\|<auth> is optional and defaults to NONE |
| _proxy_mode | Generates all API gateway resources required for proxy mode if set to True.<br>See also _api_proxy_mode in aws_lambda_function documentation below as an implicit way to enable this without a separate YAML infrastructure definition file.<br>Additional resources generated:<br>aws_iam_role with access for API GW to invoke lambda and write to logs<br>aws_api_gateway_rest_api<br>aws_api_gateway_resource<br>aws_api_gateway_method<br>aws_api_gateway_integration |
| _base_path | Used with _proxy_mode, allows specific base path to be specified, which must match regular expression " [a-zA-Z0-9$\-._+!*'( )]+$"<br>By default, this is the name of the component |
| _request_templates | Used with _proxy_mode, allows request_templates to be overridden in generated aws_api_gateway_integration<br>Defaults to '{ "application/json" = "{ \\"statusCode\\": 200 }" } }' |
| _mapping | S3 Bucket Notification Mapping<br>Preferred alternative is to define an explicit aws_s3_bucket_notification.yaml file instead |
| _api_proxy_mode | Creates API gateway deployment with proxy mode enabled for the lambda as base path.<br>NOTE: a developer may specify multiple lambdas behind a components API GW deployment, using:<br>aws_api_gateway_deployment explicitly instead. |
| _api_* | attributes starting _api_* are passed to aws_api_gateway_deployment with "_api" stripped (see aws_api_gateway_deployment documentation above) |
| _vpc_config | Specifies the list of subnet and security groups to place the lambda into, format is <subnet-name,>:<security-group-name,> (with multiple subnet or security groups delimited with a comma). |
| _lambda_functions | one or more semicolon or line delimited specification where each specification is in format:<br><function_arn_or_name>\|<events>\|<filter_prefix>\|<filter_suffix> (4 pipe delimited fields) |
| _topics | Works the same as _lambda_functions, except that the corresponding aws_sns_topic config needs to have _bucket specified with the bucket name in order to setup the sns topic policy to allow s3 notification to send to topic. |
| _queues | Works the same as _lambda_functions, except that the corresponding aws_sqs_queue config needs to have _bucket specified with the bucket name in order to setup the sqs queue policy to allow s3 notification to send to queue. |
| _bucket | Name or arn of bucket, sets up policy to allow the bucket s3 notification to publish to the topic. |

Table 4 shows an example complex_permissions attribute definition supported by the AoM 144.

TABLE 4

Complex _permissions

- name: billing_analytics-collector
    assume_role_policy: ec2.amazonaws.com
    _permissions: |-
dynamodb|BatchGetItem,BatchWriteItem,GetItem,Query,PutItem,DeleteItem,UpdateItem=table /billing_daily-cost,table/billing_weekly-cost,table/billing_total-cost,table/metrics-utilisation_daily-utilisation,table/agent-status_state
    dynamodb|GetItem,Query,Scan,PutItem,UpdateItem=table/billing_account

TABLE 4-continued

Complex _permissions logs|DescribeLogStreams=log-group:billing:log-stream:*
logs|CreateLogStream,PutLogEvents=log-group:billing:log-stream:billing_analytics_collector*
s3|ListBucket=%%envbucket%%,acp-platform-s-identity-%%env%%,acp-platform-s-discovery-%%env%%,acp-platform-s-metrics-utilisation-%%env%%
s3|GetObject-acp-platform-s-identity-%%env%%/acp3/*,acp-platform-s-discovery-%%env%%/acp3/*
s3|PutObject=%%envbucket%%/billing_daily-cost/*,%%envbucket%%/billing_weekly-cost/*,%%envbucket%%/billing_total-cost/
s3|PutObject=acp-platform-s-metrics-utilisation-%%env%%/metrics- TABLE 4-continued Complex _permissions utilisation_daily-utilisation/*
    sns|Publish=billing_tenant-cost-topic Table 5 shows example IaC instructions that the instantiation circuitry 142 builds from the AoM example in Table 4.

TABLE 5

IaC instructions for complex _permissions

```
# Generating aws_iam_role_policy for aws_iam_role
# --------------------------------------------
resource "aws_iam_role_policy" "billing_analytics-
collector_role_policy" {
    policy = <<EOF
{
    "Statement": [
        {
            "Action": [
                "dynamodb:BatchGetItem",
                "dynamodb:BatchWriteItem",
                "dynamodb:GetItem",
                "dynamodb:Query",
                "dynamodb:PutItem",
                "dynamodb:DeleteItem",
                "dynamodb:UpdateItem"
            ],
            "Effect": "Allow",
            "Resource": [
                "arn:aws:dynamodb:us-east-
1:309983114184:table/billing_daily-cost/*",
                "arn:aws:dynamodb:us-east-
1:309983114184:table/billing_daily-cost",
                "arn:aws:dynamodb:us-east-
1:309983114184:table/billing_weekly-cost/*",
                "arn:aws:dynamodb:us-east-
1:309983114184:table/billing_weekly-cost",
                "arn:aws:dynamodb:us-east-
1:309983114184:table/billing_total-cost/*",
                "arn:aws:dynamodb:us-east-
1:309983114184:table/billing_total-cost",
"arn:aws:dynamodb:us-east-1:309983114184:table/metrics-
utilisation_daily-utilisation/*
",
"arn:aws:dynamodb:us-east-1:309983114184:table/metrics-
utilisation_daily-utilisation",
                "arn:aws:dynamodb:us-east-
1:309983114184:table/agent-status_state/*",
                "arn:aws:dynamodb:us-east-
1:309983114184:table/agent-status_state"
            ]
        },
        {
            "Action": [
                "dynamodb:GetItem",
                "dynamodb:Query",
                "dynamodb:Scan",
                "dynamodb:PutItem",
                "dynamodb:UpdateItem"
            ],
            "Effect": "Allow",
            "Resource": [
                "arn:aws:dynamodb:us-east-
1:309983114184:table/billing_account/*",
                "arn:aws:dynamodb:us-east-
1:309983114184:table/billing_account"
            ]
        },
        {
            "Action": [
                "logs:DescribeLogStreams"
            ],
            "Effect": "Allow",
            "Resource": [
"arn:aws:logs:us-east-1:309983114184:log-group:billing:log-
stream:*"
            ]
        },
        {
            "Action": [
                "logs:CreateLogStream",
                "logs:PutLogEvents"
            ],
            "Effect": "Allow",
            "Resource": [
"arn:aws:logs:us-east-1:309983114184:log-group:billing:log-
stream:billing_analytics-collector*"
            ]
        },
        {
            "Action": [
                "s3:ListBucket"
            ],
            "Effect": "Allow",
            "Resource": [
                "arn:aws:s3:::acp-platform-s-billing-sandbox1",
                "arn:aws:s3:::acp-platform-s-identity-sandbox1",
                "arn:aws:s3:::acp-platform-s-discovery-sandbox1",
                "arn:aws:s3:::acp-platform-s-metrics-utilisation-
sandbox1"
            ]
        },
        {
            "Action": [
                "s3:GetObject"
            ],
            "Effect": "Allow",
            "Resource": [
                "arn:aws:s3:::acp-platform-s-identity-sandbox1/acp3/*",
                "arn:aws:s3:::acp-platform-s-discovery-sandbox1/acp3/*"
            ]
        },
        {
            "Action": [
                "s3:PutObject"
            ],
            "Effect": "Allow",
            "Resource": [
                "arn:aws:s3:::acp-platform-s-billing-
sandbox1/billing_daily-cost/*",
                "arn:aws:s3:::acp-platform-s-billing-
sandbox1/billing_weekly-cost/*",
                "arn:aws:s3:::acp-platform-s-billing-
sandbox1/billing_total-cost/"
            ]
        },
        {
            "Action": [
                "s3:PutObject"
            ],
            "Effect": "Allow",
            "Resource": [
                "arn:aws:s3:::acp-platform-s-metrics-utilisation-
sandbox1/metrics-utilisation_daily-utilisation/*"
            ]
        },
        {
            "Action": [
                "sns:Publish"
            ],
            "Effect": "Allow",
            "Resource": [
                "arn:aws:sns:us-east-1:309983114184:billing_tenant-cost-
topic"
            ]
        }
    ],
    "Version": "2012-10-17"
}
EOF
    role = "${aws_iam_role.billing_analytics-collector.id}"
    name = "billing_analytics-collector_role_policy"
```

In some implementations, the instantiation circuitry 142 accesses infrastructure configuration files in a pre-defined directory. The configuration files may specify defaults per resource type, specific resource and other variables, and other configuration parameters. There may be resource specific configuration files, for instance, that inherit/override from a base configuration file. Table 6 shows an example base configuration file.

TABLE 6

Infrastructure Configuration File basebucket:
defines the S3 bucket prefix to use before component name is affixed to it
useRemoteState:
"True" causes the IaC tool remote state to be stored in S3 bucket matching <basebucket>-<component>-<envname> format
dependant_components:
List of other component names to load from IaC (remote) state file
<resource_type>:
contains "defaults" with map of parameters for specific resource type OR contains specific resource type name with parameters
{
    "basebucket":"acp-platform-s",
    "useRemoteState":true,
    "aws_dynamodb_table": {
        "defaults": {
            "read_capacity": 5,
            "write_capacity": 5
        },
        "billing_daily-cost": {
        "read_capacity": 30,
        "write_capacity": 30
        }
    },
    "aws_elasticache_cluster": {
        "defaults": {
            "node_type": "cache.m4.large"
        }
    },
    "dependant_components": ["environment-dns"]
}

Table 7 provides an example test configuration file format. The architecture 108 and validation circuitry 152 may implement many other formats driven by any particular implementation.

TABLE 7

Test Configuration File Format enabled:
Optional - Boolean True by default, if set to False then infrastructure test will be skipped during load, and this may cause test failures if infrastructure definition exists.
sdk_service:
Optional - the name of the SDK service to use, derived from the IaC type name if not defined (e.g., 'aws_dynamodb_table').
sdk_type:
Optional - defines the SDK (e.g., Boto3 for AWS) top level class to use for the service - either "client" (default) or "resource".
The AWS Boto3 SDK supports both client and resource style API calls, depending on the AWS service.
An example of configuration using the resource API for DynamoDB is:
sdk_type: resource
resources:
  - name: billing_account
    tests:
      - "table_status == 'ACTIVE'
sdk_resource_type:
Optional - the name of the resource type to query from the sdk_service, derived from the Terraform type name if not defined (e.g., 'aws_dynamodb_table')
sdk_waiter:

TABLE 7-continued

Test Configuration File Format

Optional - name of the AWS Boto3 client waiter if available. If set, this will cause the SDK call to automatically wait until the resource has been created. One use case is when the infrastructure provider has previously just created a resource and not yet completed before infrastructure tests have completed.
Example values are "table_exists" for DynamoDB and "stream_exists" for Kinesis.
sdk_describe_method:
Optional - name of the SDK method (when sdk_type = 'client') to invoke to describe the resource, defaults to "describe_<sdk_resource_type>" (e.g. "describe_table" for dynamodb).
sdk_resource_id_param:
Optional - name of the parameter to pass to sdk_describe_method, derived from "<sdk_resource_type>Name" by default (with first character of sdk_resource_type uppercased).
Example: the AWS Boto3 SDK call to describe a dynamodb table is boto3.client("dynamodb").describe_table(TableName="mytable"), so sdk_resource_id_param would be "TableName".
Another example for sqs queues which do not have a describe_queue method, so sdk_resource_id_param is set to QueueName and sdk_describe_method is set to get_queue_url as per the AWS Boto3 SQS documentation.
resources:
Required - List of map / dictionary objects with each containing resource specific parameters. See table 8 for resource specific parameters.
sdk_kwargs:
Optional - Additional arguments can be pass to the sdk_describe_method call per resource via the sdk_kwargs which may take the form of a dictionary object / map, e.g.,:
- name: billing_daily-cost
  sdk_kwargs:
    abc: 123
    xyz: 456

Table 8 shows resource specific parameters for tests.

TABLE 8

Resource Specific Parameters name:
Required - Name of the resource matching that in the infrastructure definition (note, it is possible to have additional tests that are not defined in infrastructure).
tests:
Required - List of strings, with each string being a JMESPath expression that is evaluated against the response of the SDK call.

Table 9 shows an example test for checking that the sqs and dead letter queues exist.

TABLE 9

Example Test description: check the sqs and dead letter queues exist
enabled: true
name: aws_sqs_queue
sdk_describe_method: get_queue_url
sdk_resource_id_param: QueueName
resources:
- name: billing_s3-event-queue
  tests:
    - "QueueUrl ==
`https://queue.amazonaws.com/%%accountId%%/billing_s3-event-queue`"
- name: billing_s3-event-queue_dlq
  tests:
    - "QueueUrl ==
`https://queue.amazonaws.com/%%accountId%%/billing_s3-event-queue_dlq`"

Table 10 shows examples of the following six tests for checking a database table.

1: Check that the table is ACTIVE.

2: Check that the first attribute definition has an Attribute Name of "AccountId" and is of type "S" (string).

3: Check that the second attribute definition has an Attribute Name of "DateSeconds" and is of type "N" (number).

4: Check that the third attribute definition has an Attribute Name of "DateYear" and is of type "N" (number).

5: Check that the first key schema has type "HASH" with the attribute name "AccountId".

6: Check that the second key schema has type "RANGE" with the attribute name "DateSeconds".

TABLE 10

Database Table Tests

```
resources:
 - name: billing_daily-cost
tests:
    - "Table.TableStatus == 'ACTIVE'"
    - "Table.AttributeDefinitions[0] == { AttributeName:
'AccountId', AttributeType 'S' }"
    - "Table.AttributeDefinitions[1] == { AttributeName:
'DateSeconds', AttributeType: 'N' }"
    - "Table.AttributeDefinitions[2] == { AttributeName:
'DateYear', AttributeType: 'N' }"
    - "Table.KeySchema[0] == { KeyType: 'HASH', AttributeName:
'AccountId' }"
    - "Table.KeySchema[1] == { KeyType: 'RANGE', AttributeName:
'DateSeconds' }"
```

Note that the validation circuitry 152 may obtain the resource description responses (e.g., in JSON) by issuing commands to an infrastructure provider command line interface. For the example in tests in Table 10, the validation circuitry 152 may issue, e.g., a command such as "aws dynamodb describe-table—table-name billing daily-cost", with example resource description shown in Table 11.

TABLE 11

Example Resource Description

```
{
"Table": {
    "TableArn" :
"arn:aws:dynamodb:us-east-1:305720833677:table/billing_daily-
cost",
    "AttributeDefinitions": [
    {
    "AttributeName": "AccountId",
    "AttributeType: "S"
    },
    {
    "AttributeName": "DateSeconds",
    "AttributeType": "N"
    },
    {
    "AttributeName: "DateYear",
    "AttributeType": "N"
    }
    ],
    "GlobalSecondaryIndexes": [
    {
    "IndexSizeBytes": 1121619,
    "IndexName": "YearQuery",
    "Projection": {
    "ProjectionType": "KEYS_ONLY"
    },
    "ProvisionedThroughput": {
    "NumberOfDecreasesToday": 0,
    "WriteCapacityUnits": 5,
```

TABLE 11-continued

Example Resource Description

```
    "ReadCapacityUnits": 5
    },
    "IndexStatus": "ACTIVE",
    "KeySchema": [
    {
    "KeyType": "HASH",
    "AttributeName: "DateYear"
    },
    {
    "KeyType": "RANGE",
    "AttributeName": "DateSeconds"
    }
    ],
    "IndexArn":
"arn:aws:dynamodb:us-east-1:305720833677:table/billing_daily-
cost/index/YearQuery",
    "ItemCount": 18839
    }
    ],
    "ProvisionedThroughput": {
    "NumberOfDecreasesToday": 0,
    "WriteCapacityUnits": 5,
    "LastIncreaseDateTime": 1487771424.819,
    "ReadCapacityUnits": 5,
    "LastDecreaseDateTime": 1488367401.945
    },
    "TableSizeBytes": 53406402,
    "TableName": "billing_daily-cost",
    "TableStatus": "ACTIVE",
    "KeySchema": [
    {
    "KeyType": "HASH",
    "AttributeName": "AccountId"
    },
    {
    "KeyType": "RANGE",
    "AttributeName": "DateSeconds"
    }
    ],
    "ItemCount": 18839,
    "CreationDateTime": 1478292975.783
    }
}
```

The instantiation circuitry 142, state file unification circuitry 148, validation circuitry 152, AoM 144, and other features of the architecture 108 improve the operation and function of the underlying computer hardware itself. That is, these features (among others described) are specific improvements in way that the underlying computer system operates and solve technical challenges with infrastructure instantiation and validation, as well as developer collaborating in serverless execution environments. The improvements facilitate more efficient, accurate, consistent, and precise building of resources that will operate properly in serverless function environments. The improved functioning of the underlying computer hardware itself achieves further technical benefits. For example, the architecture 108 avoids lack of automation, reduces manual intervention, reduces the possibility for human error, and therefore increases infrastructure instantiation efficiency and reduces wait times for correct resource setup and execution. In addition, the architecture 108 provides additional abstraction, so that developers need not be complete experts in complex IaC syntaxes. The developers may instead concentrate on the particular goals of their projects with less time and energy spent on mastering intricate IaC coding.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways.

Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Acronyms used above include:
API: application programming interface.
CI/CD: continuous integration/continuous deployment.
DVD: digital video disc.
EC2: elastic compute cloud.
FTP: file transfer protocol.
GUI: graphical user interface.
HTML: hypertext markup language.
HTTP: hypertext transport protocol.
HTTPS: secure hypertext transport protocol.
REST: representational state transfer.
SIMD: single instruction multiple data.
SMTP: simple mail transport protocol.
SOAP: simple object access protocol.
SQS: simple queue service.
SSE: streaming SIMD extensions.
VLSI: very large scale integration.

Several implementations have been specifically described. However, many other implementations are also possible.

What is claimed is:

1. A method comprising:
   establishing, using a physical communication interface:
   a build communication channel to a serverless infrastructure provider; and
   a requester communication channel to different resource requesters who collaborate on a predetermined project;
   in a hardware data storage, storing:
   an object model comprising developer model extensions on a predetermined infrastructure as code (IaC) syntax;
   a resource request for a project resource, the resource request defined using the object model and received over the physical communication interface from a particular resource requester collaborating on the predetermined project; and
   an interdependency specifier received over the requester communication channel, the interdependency specifier identifying a dependency between the project resource and a provisioned resource for a different resource requester; and
   the hardware data storage including an assembly area providing storage for resource instantiation staging for the predetermined project; and
   at resource instantiation hardware circuitry:
   reading the resource request and the interdependency specifier; responding to the interdependency specifier by:
   locating and retrieve a state file for the provisioned resource; and
   storing the state file in the assembly area;
   generating IaC instructions from the resource request for instantiating the project resource at the serverless infrastructure provider;
   storing the IaC instructions in the assembly area;
   generating function deployment instructions from the resource request for deploying a serverless function specified in the resource request;
   storing the function deployment instructions in the assembly area;
   providing access to the state file in the assembly area by the project resource after instantiation at the serverless infrastructure provider;
   initiating resource provisioning based on the IaC instructions to instantiate the project resource; and
   initiating function provisioning based on the function deployment instructions.

2. The method according to claim 1, further comprising:
   at the resource instantiation hardware circuitry:
   validating function code for the serverless function against a predefined policy prior to initiating application provisioning.

3. The method according to claim 1, where:
   access to the state file comprises search access to the state file for determining current state of the provisioned resource.

4. The method according to claim 3, where:
   the project resource has a requirement for access to the current state of the provisioned resource, and the dependency noted in the interdependency specifier captures the requirement.

5. The method according to claim 1, further comprising:
at the resource instantiation hardware circuitry:
initiating a build of the serverless function specified in the resource request.

6. The method of claim 1, further comprising: at the resource instantiation hardware circuitry:
locating and retrieving the state file for the provisioned resource from the serverless infrastructure provider hosting the provisioned resource.

7. The method of claim 6, where:
the state file comprises a mapping between the project resource and actual implementation of the project resource with the serverless infrastructure provider.

8. The method of claim 1, further comprising:
at a resource validation hardware circuitry:
executing a post-provisioning check for the project resource after instantiation against the serverless infrastructure provider.

9. The method of claim 8, further comprising:
determining when the project resource fails the post-provisioning check, and in response, transmitting an instruction to the serverless infrastructure provider to terminate the project resource.

10. A system comprising:
a physical communication interface configured to implement:
a build communication channel to a serverless infrastructure provider; and
a requester communication channel to different resource requesters who collaborate on a predetermined project;
hardware data storage configured to store:
an object model comprising developer model extensions on a predetermined infrastructure as code (IaC) syntax;
a resource request for a project resource, the resource request defined using the object model and received over the physical communication interface from a particular resource requester collaborating on the predetermined project; and
an interdependency specifier received over the requester communication channel, the interdependency specifier identifying a dependency between the project resource and a provisioned resource for a different resource requester; and
the hardware data storage further including an assembly area operable to provide storage for resource instantiation staging for the predetermined project; and
resource instantiation hardware circuitry configured to:
read the resource request and the interdependency specifier;
in response to the interdependency specifier:
locate and retrieve a state file for the provisioned resource; and
store the state file in the assembly area;
generate IaC instructions from the resource request for instantiating the project resource at the serverless infrastructure provider;
store the IaC instructions in the assembly area;
generate function deployment instructions from the resource request for deploying a serverless function specified in the resource request;
store the function deployment instructions in the assembly area;
provide access to the state file in the assembly area by the project resource after instantiation at the serverless infrastructure provider;
initiate resource provisioning based on the IaC instructions to instantiate the project resource; and
initiate function provisioning based on the function deployment instructions.

11. The system according to claim 10, where:
the resource instantiation hardware circuitry is further configured to:
validate function code for the serverless function against a predefined policy prior to initiating application provisioning.

12. The system according to claim 10, where:
access to the state file comprises search access to the state file for determining current state of the provisioned resource.

13. The system according to claim 12, where:
the project resource has a requirement for access to the current state of the provisioned resource, and the dependency noted in the interdependency specifier captures the requirement.

14. The system according to claim 10, where:
the resource instantiation hardware circuitry is further configured to: initiate build of the serverless function specified in the resource request.

15. The system of claim 10, where:
the resource instantiation hardware circuitry engine is further configured to:
locate and retrieve the state file for the provisioned resource from the serverless infrastructure provider hosting the provisioned resource.

16. The system of claim 15, where:
the state file comprises a mapping between the project resource and actual implementation of the project resource with the serverless infrastructure provider.

17. The system of claim 10, further comprising:
resource validation hardware circuitry configured to:
execute a post-provisioning check for the project resource after instantiation against the serverless infrastructure provider.

18. The system of claim 17,
where the resource validation hardware circuitry is further configured to:
determine when the project resource fails the post-provisioning check, and inn response, transmit an instruction to the serverless infrastructure provider to terminate the project resource.

19. A product including:
machine-readable media not including a transitory signal;
instructions stored on the machine-readable media, the instructions configured to, when executed, cause a machine to:
establish, using a physical communication interface:
a build communication channel to a serverless infrastructure provider; and
a requester communication channel to different resource requesters who collaborate on a predetermined project;
in hardware data storage, store:
an object model including developer model extensions on a predetermined infrastructure as code (IaC) syntax;
a resource request for a project resource, the resource request defined using the object model and received over the physical communication interface from a particular resource requester collaborating on the predetermined project; and
an interdependency specifier received over the requester communication channel, the interdependency specifier identifying a dependency between the project resource and a provisioned resource for a different resource requester; and the hardware data storage including an assembly area operable to provide storage for resource instantiation staging for the predetermined project; and at resource instantiation hardware circuitry:

read the resource request and the interdependency specifier;

respond to the interdependency specifier by:

locate and retrieve a state file for the provisioned resource; and store the state file in the assembly area;

generate IaC instructions from the resource request for instantiating the project resource at the serverless infrastructure provider;

store the IaC instructions in the assembly area;

generate function deployment instructions from the resource request for deploying a serverless function specified in the resource request;

store the function deployment instructions in the assembly area;

provide access to the state file in the assembly area by the project resource after instantiation at the serverless infrastructure provider;

initiate resource provisioning based on the IaC instructions to instantiate the project resource; and initiate function provisioning based on the function deployment instructions.

20. The product according to claim 19, where:

the instructions are further configured to cause the machine to:

validate function code for the serverless function against a predefined policy prior to initiating application provisioning.

* * * * *

UNITED STATES PATENT AND TRADEMARK OFFICE
CERTIFICATE OF CORRECTION

PATENT NO. : 10,360,025 B2
APPLICATION NO. : 15/699207
DATED : July 23, 2019
INVENTOR(S) : Roger Foskett et al.

Page 1 of 1

It is certified that error appears in the above-identified patent and that said Letters Patent is hereby corrected as shown below:

In the Specification

Column 3, Line 29, delete "IaC" and replace with --IaC--.

Column 10, Line 54, delete "IaC" and replace with --IaC--.

Column 10, Table 1, first line under column title, delete "IaC" and replace with --IaC--.

Column 15, Table 3, Line 20 of body of table, delete ""a[a-zA-Z0-" and replace with --^[a-zA-Z0- --.

Column 17, Table 5, in the title, delete "IaC" and replace with --IaC--.

Column 20, Table 8, center title "Resource Specific Parameters" and insert dark border line under title.

Column 21, Lines 5 and 12, delete "AccountId" and replace with --AccountId--.

Column 21, Table 10, Line 6 of body of table, insert --:-- after "AttributeType".

In the Claims

Column 24, Claim 1, Lines 14, 35, 38, 47, delete "IaC" and replace with --IaC--.

Column 25, Claim 10, Lines 33, 54, 57, 66, delete "IaC" and replace with --IaC--.

Column 26, Claim 18, Line 41, delete "inn" and replace with --in--.

Column 26, Claim 19, Line 56, delete "IaC" and replace with --IaC--.

Column 27, Claim 19, Lines 11, 14, 23, delete "IaC" and replace with --IaC--.

Signed and Sealed this
Twenty-second Day of September, 2020

Andrei Iancu
*Director of the United States Patent and Trademark Office*